Figure 1A:
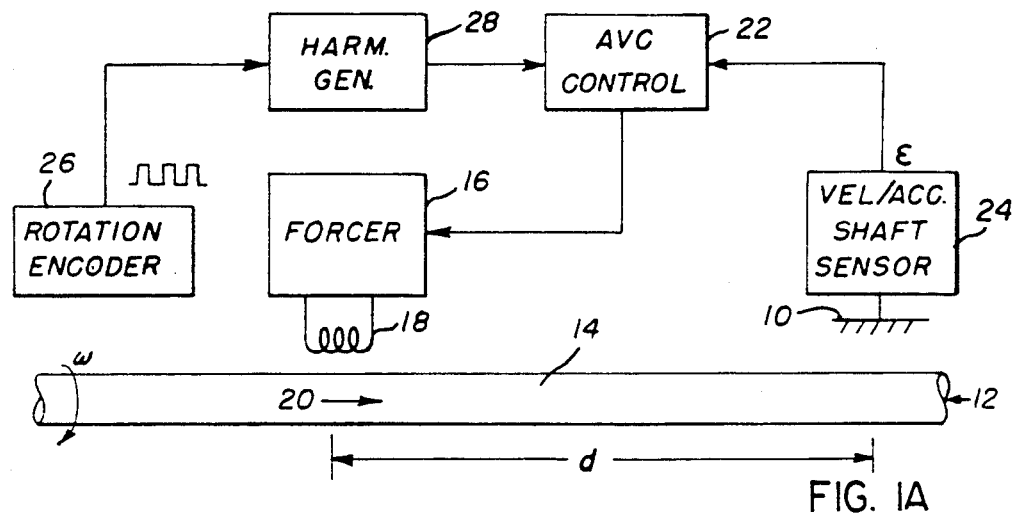

United States Patent [19]

Moulds, III

[11] Patent Number: 5,049,795
[45] Date of Patent: Sep. 17, 1991

[54] MULTIVARIABLE ADAPTIVE VIBRATION CANCELLER

[75] Inventor: Clinton W. Moulds, III, Millersville, Md.

[73] Assignee: Westinghouse Electric Corp., Pittsburgh, Pa.

[21] Appl. No.: 551,691

[22] Filed: Jul. 2, 1990

[51] Int. Cl.$^5$ .............................. G05B 13/00
[52] U.S. Cl. .................. 318/561; 318/640; 318/649; 342/378; 364/715.01; 267/136; 267/225
[58] Field of Search ............. 318/561, 640, 649; 342/378; 364/715.01; 267/136, 225

[56] References Cited

U.S. PATENT DOCUMENTS

| | | | |
|---|---|---|---|
| 4,727,503 | 2/1988 | McWhirter | 364/715.01 |
| 4,806,939 | 2/1987 | Ward et al. | 342/378 |
| 4,950,966 | 8/1990 | Moulds III | 318/561 |

Primary Examiner—William M. Shoop, Jr.
Assistant Examiner—Saul M. Bergmann
Attorney, Agent, or Firm—W. G. Sutcliff

[57] ABSTRACT

The total periodically induced vibratory disturbance in a structure having unique structural characteristics is minimized. Actuators are operated in response to complex input signals to produce counteractive forces in the structure. Sensors responsive to the vibrational disturbance and the counteractive forces produce outputs indicative thereof. A processor having an electrical characteristic related to the structural characteristic produces complex outputs for each actuator in response to the sensor inputs. The complex outputs are adjusted by the processor to result in a convergence of the structural response to the minimum vibration in response to the disturbance and the actuator inputs.

12 Claims, 2 Drawing Sheets

MULTIVARIABLE ADAPTIVE VIBRATION CANCELLER

BACKGROUND OF THE INVENTION

1. Field of the Invention

The invention relates to improvements in methods and apparatus for reducing vibration induced noise in machinery, and in particular, to a method and apparatus for actively cancelling vibrations in a structure supporting rotating machinery.

2. Prior Art

It is desirable to reduce or eliminate vibrations induced in rotating machinery. Various active and passive methods have been employed to suppress vibrations. For example, passive methods include cushion supports and mechanical damping means which in essence absorb and dissipate the vibrational energy produced by the disturbance. Passive methods are generally unsatisfactory because the vibrational energy is ultimately transferred to the environment. This occurs because the vibrational energy contains complex wave forms which manifest themselves at various harmonics of the fundamental vibration frequency. A simple mechanical absorber or damper may thus be essentially transparent to various components of the vibrational energy. Accordingly, such efforts to suppress, cancel or eliminate the vibrations may not be effective.

Active methods are more successful at eliminating or cancelling vibrations. However, these too have deficiencies. Like passive methods, active methods may only be operable within a narrow frequency range of the fundamental disturbance. In active systems a counteractive force is produced which opposes the force produced by the disturbance. The opposing force is not easily generated with accuracy because the nature of the disturbance is unknown. The problem is further aggravated by the fact that the structure may be complex and is not amenable to a simplified rigid body analysis.

3. Related Invention

Figure 1B:
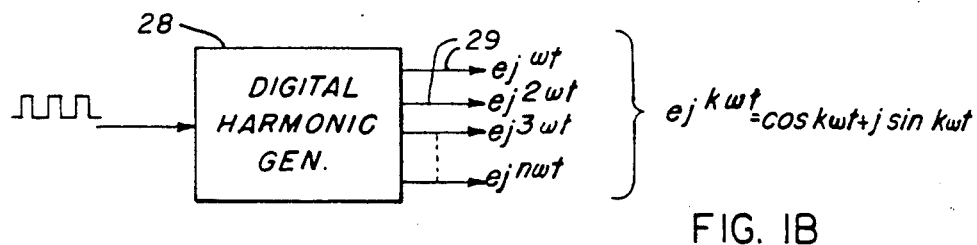

A method for reducing or cancelling vibration induced in rotating machinery is disclosed in a copending patent application Ser. No. 375,227, filed on July 3, 1989 now U.S. Pat. No. 4,950,966 which issued Aug. 21, 1990. In the application, the teachings of which are incorporated herein by reference, unwanted vibration in the mechanical structure 10 caused by a periodic pulsating force 12 in a rotating shaft 14 can be cancelled by the arrangement illustrated in FIGS. 1A–1C.

A reaction mass actuator or forcer 16, acting on the shaft 14 through a permanent magnet or electromagnet 18 applies a controlled counteractive force 20 to the shaft 14 which opposes the shaft pulsation force 12. The actuator 16 operates in response to an output of adaptive vibration canceller 22. The counteractive force 20 cancels the vibrations in the structure as measured by the velocity or acceleration sensor 24 which is physically remote from the forcer 16 as illustrated. The adaptive vibration canceller (AVC) 22 generates weighted sinusoidal force components which follow the harmonic frequencies of the shaft pulsation force 12. In the system described, rotation speed $\omega$ of the shaft 14 is measured by an optical or magnetic incremental encoder 26 which produces output pulses in synchronism with the rotation of the shaft 14. The output of the encoder 26 is harmonically related to the shaft pulsation force 12. Accordingly, shaft rotation speed $\omega$ and force output 20 are related.

In the arrangement illustrated, a rotational harmonic generator 28 (FIGS. 1A and 1B) responsive to the encoder 26 produces various time base sinusoidal signals 29 at the fundamental rotational speed $\omega$ of the shaft 14 and at harmonics thereof. The time base sinusoidal signals or outputs 29 of generator 28 are in the form: $e^{jk\omega t}$, where k is an integer 1, 2, 3 ... n and $\omega$ is the speed of the shaft 14. The outputs of the generator 28 are used to generate weighted force component signals 30 in adaptive vibration canceller 22 at the various selected harmonics. The actuator 16 may thus be controlled by means of adaptive vibration canceller 22, encoder 26 and the generator 28 at the fundamental shaft rotation frequency and at various selected harmonics thereof. It is to be understood that because harmonic frequencies of the force components are based upon the encoder outputs, the weighted force components 30 follow the harmonic of the pulsation force or disturbance 12 as the shaft rotation speed varies. Other vibration cancellation schemes based on FFT or time-domain methods would use the same time base, but would not generate the same sinusoidal waveforms.

Any number of harmonics may be employed to produce the desired force components. For the purpose of this discussion, only the kth harmonic is illustrated it being understood that the sum of the various selected harmonics drive the actuator 16.

In the illustration (FIG. 1C), the disturbance or pulsation force 12 may be represented as a complex number in the form of A sin kwt and B cos kwt. A and B are unknown coefficients of a single complex number. The weighted force components 30 are signals which drive forcer 16 and are also represented in the form C sin and D cos where C and D are the weighted coefficients of a complex number. The values of C and D are varied to thereby control the response of the forcer 16. Sin and cos components are supplied by the generator 28 at kth harmonic.

The entire structure 10 has a system dynamic characteristic 32 which is in the form of $G < \phi$ where G is the gain at the kth harmonic represented by the ratio of the accelerometer output 25 over the actuator input 30, and $\phi$ is the phase angle between the signals.

Figure 1C:
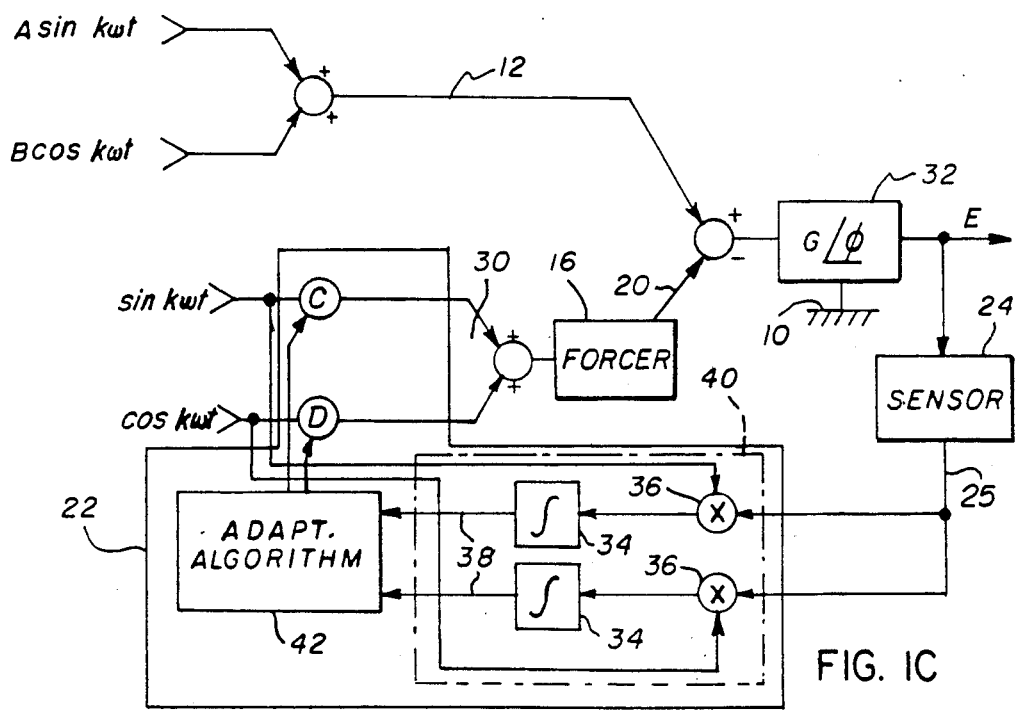

In the arrangement FIG. 1C, the mechanical disturbance 12 is mechanically combined with the counter active force 20 of the forcer 16 by interaction with the structure 10. The resulting physical acceleration E is detected by sensor 24 (e.g., accelerometer). The output 25 of sensor 24 is coupled to adaptive vibration canceller 22 wherein it is multiplied at 36 and integrated over time at 34 in the preprocessor 40 by the kth harmonic from the generator 28. The outputs 38 are Fourier coefficients of E in the form of sin wt and cos wt and feed adaptive algorithm processor 42 which produces weighted components C and D which are combined with the generator outputs to produce weighted force component outputs 30 for driving forcer 16.

In the arrangement described for one forcer 16 and one sensor 24, the adaptive algorithm processor 42 solves two linear equations for the two unknowns A and B which then determine the weighted values C and D. The combined weighted force component signals C sin kwt, D cos kwt, 30 drive the forcer 16 at the kth harmonic.

In the current harmonic (or Fourier series) based algorithm the sine and cosine waveforms at each harmonic frequency are multiplied by adaptively adjusted weights C and D and are then summed with the corresponding sines and cosines from the other harmonics to determine the controlled force 20 applied to the shaft 14 via the reaction mass actuator or forcer 16. The accelerometer measurement signal (which must be minimized in an adaptive vibration cancellation system) is resolved into its Fourier components by separately multiplying it by the sine or cosine of each harmonic frequency and integrating the product over an entire cycle of shaft rotation, obtaining two error signal Fourier coefficients at each harmonic frequency. The Fourier coefficients at a given frequency are then used to adjust the actuator adaptive weights at that same frequency, so as to minimize these error signal Fourier coefficients themselves. As long as the mechanical vibrational system is linear, the adaptation process at one harmonic frequency will not interact with the adaptation at any other harmonic frequency. These operations for the kth harmonic summarized in FIG. 1C may thus be combined with other harmonics of interest.

The arrangement described more fully and in greater detail in the above-identified application is directed to a single forcer, single accelerometer system and does not address the problem of reducing vibrations at various locations in a complex structure. The problem is complicated by the fact that the number of actuators is usually fewer than the number of accelerometers. Also, to be most effective, actuators should be designed into the equipment and not merely added on. This greatly reduces the number of available actuator locations. Thus the cost of such equipment is considerably increased for each actuator provided.

SUMMARY OF THE INVENTION

The present invention has been designed to minimize the total periodically induced vibratory disturbance in a structure having a unique dynamic structural characteristic. In the invention, a plurality of actuators and an equal or greater number of accelerometers are employed. Each actuator significantly interacts with each accelerometer to achieve the lowest possible resulting vibration in accordance with the structural characteristic.

In the exemplary embodiment, the actuators are operated in response to complex input signals to produce counteractive forces in the structure. Accelerometers sense the combined structural response to the vibrational disturbance and the counteractive forces and produce outputs indicative thereof. An adaptive algorithm processor which has an electrical characteristic related to the structural characteristic produces complex outputs for each actuator. The complex outputs are adjusted by the processor to result in a structural response to the combined disturbance and the actuator inputs which minimizes vibration energy at the accelerometer locations.

DESCRIPTION OF THE INVENTION

In accordance with the invention in a complicated structure, the total vibrational energy can be made much lower if several forcers placed at different locations are used to cancel the disturbance rather than simply using just one. When it is desired to cancel vibrations at more than one place in the mechanical structure, several accelerometers are mounted at the various locations. The goal of the vibration cancellation system can then be to minimize the total vibrational energy at the locations. If the number (n) of forcers or actuators is less than the number (m) of accelerometers, which is typical, the total vibrational energy cannot be made zero, rather it can be minimized. This is achieved by minimizing the sum of the squares of the accelerometer signals as hereinafter described In the arrangement illustrated, a system 50 may be a complex structure upon which a disturbance 52 is imposed. As in the previously described arrangements, each input may be represented as a composite of sin and cos components. For simplicity, however, each input is represented as a single line. Also, the sinusoidal time base outputs 29 of harmonic generator 28 (FIG. 1B) are applied as described in the related patent application to provide the harmonic time base of the system. In the system a plurality of accelerometers or detectors 54 (1, 2, ... m) are placed at various locations to detect the motion or acceleration of the structure 50 at such points. A plurality of forcers or actuators 56 (1, 2, ... n), where $n \leq m$, interact with the structure 50 to impose counteractive forces 58 thereon as shown. The sum of the system responses to the disturbance 52 and the various forcer inputs 64(1) ... (64(n) is sensed by each of the accelerometers 54, each of which, in turn, produces a complex output 60 (1, 2, ... m). For each harmonic frequency of interest (in the case illustrated the kth harmonic) an adaptive multivariable vibration cancellation system or processor 62 of the invention produces weighted complex electrical outputs 64 which drive each of the forcers 56 such that the output 60 of accelerometers 54 outputs go to a minimum. Although not shown in detail, it should be readily understood that weighted outputs 64'(1) ... 64'(n) from other processors for other harmonics of interest may be combined with the outputs 64(1) ... 64(n) at the kth harmonic to drive forcer 56.

The physical system 50 has a dynamic system characteristic which may be determined by experimental means. For example, each forcer 56 may be activated one at a time by a complex input of a selected frequency while the physical system 50 is at rest. Outputs 60 of the various accelerometers 54 may be input to a spectrum analyzer such as a model 1172 Frequency Responsive Analyzer manufactured by Schlumberger, Inc. Each forcer 56, thereby produces a resulting vibration in the physical system which produces a corresponding measurable output at each accelerometer.

Each forcer 56 may be operated separately at the particular input frequency of interest and each accelerometer output 60 may be separately analyzed to compile a matrix of data for various frequencies and harmonics of such frequency. The various forcer inputs are selected in anticipation of the rotational speeds at which it is expected that the equipment will be operated. In the preferred embodiment, the equipment is not operated while the measurements are made. For each forcer input at a selected frequency of interest, the physical system can be represented by an m by n transfer function matrix [A] of complex numbers. (When 2 forcers and 4 accelerometers are used a 4 by 2 matrix results which may be represented as follows:

TABLE I

| | | Forcer Input | |
|---|---|---|---|
| | | 1 | 2 |
| Accelerometer | 1 | $1 + j$ | $5 + j$ |
| Output | 2 | $2 + j$ | $6 + 2j$ |
| | 3 | $3 + 2j$ | $7 - j$ |

TABLE I-continued

| Forcer Input | |
|---|---|
| 1 | 2 |
| 4 4 − 5j | 8 + j |

Table I is representative of the kth harmonic of the dynamic system characteristic, i.e., the waveform is represented as a complex number.

The mechanical structure 50, as represented by the 4 by 2 transfer function matrix [A] of complex numbers of the kth harmonic relates the Fourier input coefficients of the forcers 56 (1, 2, . . . n) to the Fourier output coefficients of the accelerometers 54 (1, 2, . . . m). During operation, each accelerometer 54 measures the vibrational disturbance 52 at its location as well as the effect of each forcer 56 at such location, so that the m, kth harmonic accelerometer Fourier output coefficients 60 (1, 2, . . . m) may be combined as a multivariable adaptive vibration cancellation complex vector E. The values of E are processed in the adaptive vibration cancellation processor 62 to produce the forcer inputs 64 by means of a matrix algebra algorithm. E represents the error signal (algebraic sum) or difference between the disturbance and all the counteractive forces on the structure 50.

In accordance with the present invention, the components of the complex numbers of the transfer function matrix [A] are known for all harmonic frequencies at which vibration cancellation is to occur. Because shaft rotation speed can change, a frequency response matrix is generated over a wide range of frequencies of interest for the mechanical structure with respect to the forcer and accelerometer locations as noted above. Further, because the mechanical structure is complicated, there is a significant interaction between every forcer and every accelerometer. Accordingly, the adaptive vibration canceller 62 must use all four accelerometer output signals 60 to obtain the two forcer signals 64 in a single coordinated multi-input, multi-output algorithm.

The kth harmonic relation shown in the drawing between the forcers 56, the accelerometers 54, the disturbance 52 and the physical system 50 may be summarized by the following expression:

$$E = b - AX \quad (1)$$

Where E is the vector of four complex numbers which are the kth harmonic Fourier coefficients of the four accelerometers 54; b is the vector of the coefficients representing the vibrational disturbance 52 acting on the four accelerometers 54 which is an unknown vector input; [A] is the complex 4 by 2 physical system transfer function matrix; and x is the vector of two forcer Fourier coefficients. The terms on the right hand side of the expression, namely, b and Ax, express the two sources of vibration measured by the accelerometers, namely, the vibrational disturbance b which is unknown and the forcer motion Ax which is established by the algorithm processor output. The expression E is the total vibration energy at the accelerometer locations. It is intended that the magnitude of the accelerometer vector E should be minimized by employing a sum of the squares operation on the accelerometer coefficients.

A variety of mathematical processes may be employed to achieve the desired minimization of the vector. However, in a preferred embodiment the vector of forcer signals 64 which act to minimize the magnitude of the accelerometer vector E can be resolved by solving the so called normal equations for x.

For a discussion of the normal equations in the solution references directed to Dhalquist and Bjorck, *Numerical Methods*, Prentice Hall, 1974, pp. 196–199. In the method, the following expression may be employed:

$$A^{*T}(b - Ax) = 0 \quad (2)$$

where $[A^{*T}]$ is a 2 by 4 matrix, known as the complex conjugate transpose of [A]. Referring to Table 2 below the complex conjugate transpose $[A^{*T}]$ of [A] (Table 1) may be expressed as follows:

TABLE II

| | Accelerometer Fourier Coefficient Inputs to Matrix Multiplication | | | |
|---|---|---|---|---|
| | 1 | 2 | 3 | m |
| Matrix Multiplication Outputs (Integrator Inputs) | 1    1 − j | 2 − j | 3 − 2j | 4 + 5j |
| | n    5 − j | 6 − 2j | 7 + j | 8 − j |

In the transposition, the sign of the imaginary part (j) is changed and the row positions of transfer function [A] entries become column positions of $[A^{*T}]$ entries.

At the frequency of the kth harmonic, the transfer function matrix [A] is empirically determined. Matrix $[A^{*T}]$ is determined by the mathematical transposition. Once the harmonic is known, the forcer vector x can be determined, because the output of the adaptive vibration cancellation processor 62 is thus specified by mathematical operation. Although the vector b representing the disturbance is not known, the vector E = b − Ax is measured directly by the accelerometers.

A method of solving the expression $A^{*T}(b - Ax) = 0$ above and minimizing the total vibration energy, is given by the following complex vector matrix integral equation:

$$x = \mu \int A^{*T} E \, dt \quad (3)$$

or its equivalent $$x = \mu \int A^{*T}(b - Ax) \, dt \quad (4)$$

where $\mu$ is a positive constant used to control the speed of convergence of the algorithm and the interval of integration may be one revolution of the shaft for each iteration.

Figure 2:
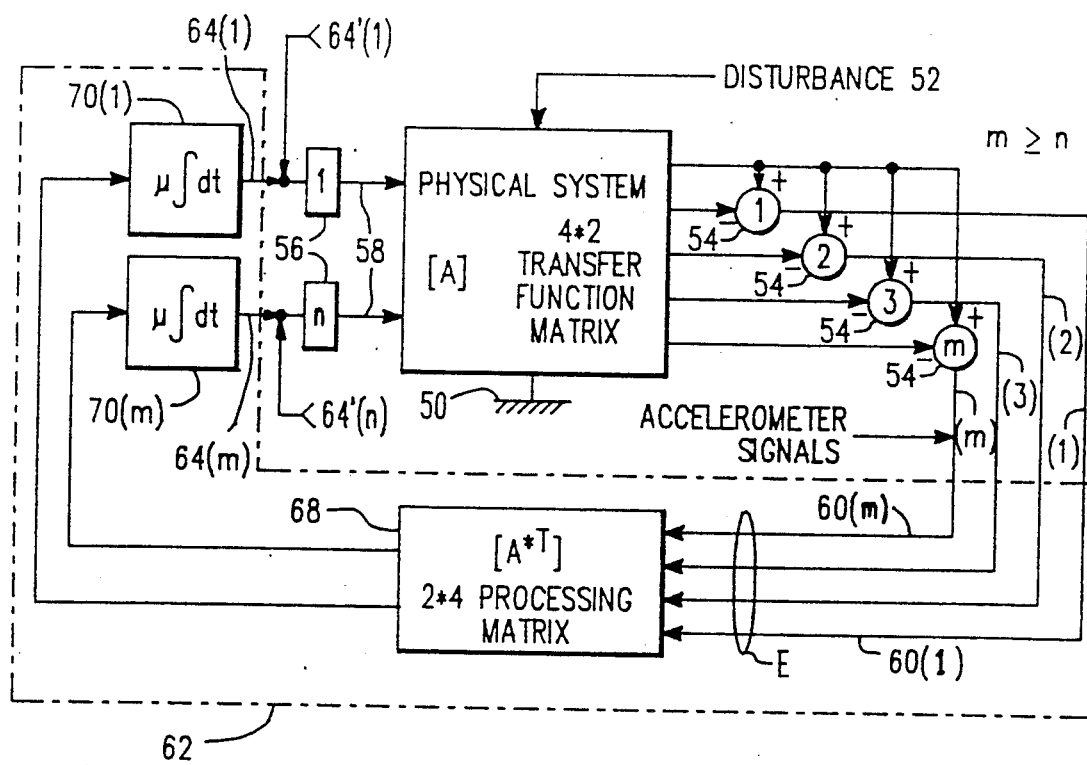

In FIG. 2, the adaptive vibration cancellation processor 62 includes processing matrix 68 which effects the complex conjugate transpose of transfer function matrix A. The $A^{*T}$ values or instantaneous forcer inputs from rows 1 and 2 of Table 2 are separately processed in respective integrators 70 (1, 2, . . . n) in order to produce values 64 (1, 2, . . . n) which are solutions for x for the equations (3) and (4). The harmonic generator time base sinusoidal outputs 29 combine with integrators 70 to produce the complex solution. The discrete time equivalent of integration must be used for the integrators shown since the accelerometer Fourier coefficients are updated at the end of each cycle of shaft rotation.

In order to minimize vibration, the adaptive vibration cancellation processor 62 must produce values of x which converge to a solution of the normal equations (2). A minimum-vibration condition, can be shown by defining $$y = A^{*T}(b - Ax) \quad (4)$$

for which the time derivative is $$\frac{dy}{dt} = -\mu A^{*T} A y \quad (5)$$

If the eigenvalues (i.e., vector equivalents of a scalar Laplace transform characteristic equation solution) of $-\mu A^{*T}A$ are negative or zero, then y converges asymptotically to zero and the solution of the normal equations. It should be understood that the initial conditions of y associated with zero eigenvalues are zero themselves.

From the definition of eigenvalues, $$-\mu A^{*T} A z = \lambda z \quad (6)$$

where $\lambda$ is an eigenvalue of $-\mu A^{*T}A$ and z is its associated eigenvector. Premultiplying both sides of this equation by $z^{*T}$, $$-\mu z^{*T} A^{*T} A z = -\mu (Az)^{*T}(Az) = \lambda z^{*T} z \quad (7)$$

Since $(Az)^{*T}(Az)$ and $z^{*T}z$ are both either positive or zero, and since $\mu$ is a positive constant, the eigenvalue $\lambda$ must be negative or zero. So the vector y and the corresponding vector of forcer signals 64 i.e., solutions for x in (4) converge to the solution of the normal equations (2). This means that the multivariable adaptive vibration cancellation processor 62 shown in FIG. 2 with adaptation algorithm given in equation (3) will minimize the vibration energy measured at the accelerometers.

While there has been described what at present is believed to be the preferred embodiment of the present invention, it will be apparent to those skilled in the art the various changes and notifications may made therein without departing from the invention, and is intended in the appended claims to cover all such modifications and changes that come within true spirit and scope of the invention.

What is claimed is:

1. A multivariable adaptive vibration canceller for minimizing vibratory disturbances periodically induced in a structure comprising:
    a plurality of actuators operatively coupled to the structure for producing a counteracting vibration therein in response to a complex input signal for each actuator, the structure having a dynamic system characteristic in the form of a matrix of complex system responses to known vibrational inputs at selected harmonics of interest;
    a plurality of sensors, at least equal in number to the number of actuators, said sensors being coupled to the structure for sensing vibrations induced therein by the actuators and the disturbances, each sensor for producing a complex output representative of the algebraic sum of such vibrations sensed thereby for each harmonic; and
    multivariable adaptive vibration cancellation processor means responsive to complex outputs of the sensors for producing the complex inputs to the actuators, said vibration cancellation processor means having processing characteristic in the form of a complex conjugate transpose matrix of the dynamic system characteristic matrix.

2. Apparatus for adaptively cancelling the vibration caused by external forces acting on a dynamic structure comprising:
    means for applying counteractive forces to said structure at a plurality of predetermined points in response to corresponding weighted force component signals;
    means for generating a time base signal related to the dynamics of said structure;
    means for generating sets of time base sinusoidal signals of at least one harmonic frequency of the time base signal;
    means remote from said means for applying counteractive forces for sensing the algebraic sums of the magnitude of the external forces and the counteractive forces on the structure;
    means responsive to the structure for generating error signals therefrom in accordance with a dynamic system characteristic in the form of a matrix;
    means for generating corresponding sets of Fourier coefficient signals from the error signals;
    means employing a complex conjugate transpose matrix of the dynamic system characteristic, for generating sets of adaptive weighting coefficients in accordance with a predetermined adaptation algorithm in response to said error signals; and
    means for multiplying said sets of time base sinusoidal signals by the respective weighting coefficients of said sets of Fourier coefficient signals for producing said corresponding weighted force component signals.

3. The apparatus as defined by claim 2 wherein said means for generating said adaptive weighting coefficients includes means for implementing a least squares algorithm.

4. The apparatus as defined by claim 2 wherein said structure includes a rotating shaft and wherein said means for generating said time base signal comprises means generating a pulse output signal in response to the rotational speed of said shaft.

5. The apparatus as defined by claim 4 wherein said means for generating a set of time base sinusoidal signals comprises a digital harmonic generator coupled to said means for generating a pulse output signal.

6. The apparatus as defined by claim 2 wherein said means for generating said sets of Fourier coefficient signals includes means for multiplying each of said sets of time base sinusoidal signals by said sets of error signals and means coupled to said multiplying means for integrating the multiplied signals.

7. The apparatus as defined by claim 2 wherein said time base sinusoidal signals comprise sine and cosine components of said at least one harmonic frequency of the time base signal.

8. A method for adaptively cancelling the vibration caused by external forces acting on a dynamic structure, comprising the steps of:
    measuring the external force acting on said body at a first point on said body;
    applying counteractive forces to said body at a plurality of points to counteract the external forces acting on said body;
    generating a time base signal related to dynamic system characteristics of said structure;
    generating sets of time base sinusoidal signals from at least one harmonic frequency of the time base signal;

determining the algebric sum of the magnitude of the external forces and the counteractive forces at each of said points and generating corresponding error signals therefrom in accordance with a dynamic system characteristic in the form of a matrix;

generating sets of Fourier coefficient signals from the error signals and said sets of time base sinusoidal signals;

generating sets of adaptive weighting coefficients in accordance with a predetermined adaptation algorithm employing a complex conjugate transposition matrix of the dynamic system characteristic in response to said error signals;

multiplying said sets of time base sinusoidal signals by the set of respective weighting coefficients of said set of Fourier coefficient signals for producing weighted force component signals;

combining said weighted force component signals and generating a composite counteractive force therefrom; and applying said counteractive force to said body in response to said reaction force signal.

9. The method as defined by claim 8 wherein said adaptation algorithm comprises a least squares adaptive algorithm.

10. The method as defined by claim 8 wherein said step of generating a time base signal comprises generating a time base signal related to the movement of said structure.

11. The method as defined by claim 8 wherein said step of generating said sets of Fourier coefficient signals comprises the further steps of multiplying each of said sets of time base sinusoidal signals by said error signals and then integrating the signals resulting from said multiplying step.

12. The method as defined by claim 8 wherein said time base sinusoidal signals comprise sine and cosine components of said at least one harmonic frequency.

* * * * *